United States Patent
Watanabe et al.

(10) Patent No.: US 6,906,129 B2
(45) Date of Patent: Jun. 14, 2005

(54) POLYMER SCALE PREVENTIVE AGENT

(75) Inventors: Mikio Watanabe, Kashima-gun (JP); Tadashi Amano, Kashima-gun (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/933,294

(22) Filed: Sep. 3, 2004

(65) Prior Publication Data

US 2005/0054789 A1 Mar. 10, 2005

(30) Foreign Application Priority Data

Sep. 5, 2003 (JP) .................................... 2003-313589

(51) Int. Cl.[7] .............................................. C08L 61/22
(52) U.S. Cl. ..................... 524/593; 526/83; 526/84; 526/348; 526/344; 526/343; 526/317.1; 526/346; 526/310; 526/332; 526/82; 524/877; 524/597; 524/612; 524/876
(58) Field of Search .............................. 526/82, 83, 84, 526/348, 344, 343, 317.1, 346; 524/593, 877, 597, 612, 876

(56) References Cited

U.S. PATENT DOCUMENTS

| | | |
|---|---|---|
| 4,900,695 A | 2/1990 | Takahashi et al. |
| 4,933,399 A | 6/1990 | Shimizu et al. |
| 4,977,105 A | 12/1990 | Okamoto et al. |
| 5,034,477 A | 7/1991 | Shimizu et al. |
| 5,034,478 A | 7/1991 | Shimizu et al. |
| 5,037,904 A | 8/1991 | Ueno et al. |
| 5,053,466 A | 10/1991 | Shimizu et al. |
| 5,098,968 A | 3/1992 | Ueno et al. |
| 5,115,051 A | 5/1992 | Shimizu et al. |
| 5,130,386 A | 7/1992 | Kaneko et al. |
| 5,147,455 A | 9/1992 | Watanabe et al. |
| 5,196,164 A | 3/1993 | Shimizu et al. |

(Continued)

FOREIGN PATENT DOCUMENTS

| | | |
|---|---|---|
| EP | 0 008 799 | 3/1980 |
| EP | 0 372 996 | 6/1990 |
| EP | 0 574 155 | 12/1993 |
| EP | 0 598 537 A1 | 5/1994 |
| EP | 0 934 955 | 8/1999 |
| WO | WO 96/35723 | 11/1996 |
| WO | WO 96/39446 | 12/1996 |
| WO | WO 97/08210 | * 3/1997 |

Primary Examiner—William K. Cheung
(74) Attorney, Agent, or Firm—Oblon, Spivak, McClelland, Maier & Neustadt, P.C.

(57) ABSTRACT

A polymer scale preventive agent for use in the polymerization of a monomer containing an ethylenic double bond is provided. The agent includes (A) a condensation reaction product obtained by reacting an aldehyde compound and a hydroxynaphthalene-based compound in the presence of a reducing agent, and (B) a polymer compound containing a nitrogen atom. This agent is capable of forming a coating with satisfactory scale prevention properties on inner wall surfaces of a polymerization vessel with a single-stage application, enabling the production process time to be shortened and the productivity and quality of polymeric products improved.

15 Claims, 2 Drawing Sheets

U.S. PATENT DOCUMENTS

| | | |
|---|---|---|
| 5,204,286 A | 4/1993 | Doan |
| 5,214,112 A | 5/1993 | Shimizu et al. |
| 5,214,113 A | 5/1993 | Shimizu et al. |
| 5,229,471 A | 7/1993 | Shimizu et al. |
| 5,244,986 A | 9/1993 | Watanabe et al. |
| 5,262,352 A | 11/1993 | Woo et al. |
| 5,262,497 A | 11/1993 | Watanabe et al. |
| 5,292,834 A | 3/1994 | Watanabe et al. |
| 5,298,220 A | 3/1994 | Shimizu et al. |
| 5,352,748 A | 10/1994 | Shimizu et al. |
| 5,357,009 A | 10/1994 | Shimizu et al. |
| 5,360,857 A | 11/1994 | Kitamura et al. |
| 5,378,773 A | 1/1995 | Shimizu et al. |
| 5,378,774 A | 1/1995 | Shimizu et al. |
| 5,391,653 A | 2/1995 | Shimizu et al. |
| 5,393,857 A | 2/1995 | Shimizu et al. |
| 5,397,849 A | 3/1995 | Shimizu et al. |
| 5,399,613 A | 3/1995 | Shimizu et al. |
| 5,403,903 A | 4/1995 | Shimizu et al. |
| 5,416,174 A | 5/1995 | Shimizu et al. |
| 5,420,214 A | 5/1995 | Shimizu et al. |
| 5,424,003 A | 6/1995 | Shimizu et al. |
| 5,424,377 A | 6/1995 | Shimizu et al. |
| 5,430,113 A | 7/1995 | Usuki et al. |
| 5,432,241 A | 7/1995 | Usuki et al. |
| 5,442,017 A | 8/1995 | Shimizu et al. |
| 5,457,170 A | 10/1995 | Shimizu et al. |
| 5,484,855 A | 1/1996 | Shimizu et al. |
| 5,484,856 A | 1/1996 | Shimizu et al. |
| 5,508,361 A | 4/1996 | Shimizu et al. |
| 5,574,115 A | 11/1996 | Shimizu et al. |
| 5,576,370 A | 11/1996 | Shimizu et al. |
| 5,602,215 A | 2/1997 | Watanabe et al. |
| 5,616,660 A | 4/1997 | Shimizu et al. |
| 5,627,395 A | 5/1997 | Witek et al. |
| 5,723,553 A | 3/1998 | Watanabe et al. |
| 6,037,246 A | 3/2000 | Bhat et al. |
| 6,037,426 A | 3/2000 | Shimizu et al. |
| 6,320,001 B1 | 11/2001 | Shimizu et al. |
| 6,335,403 B1 | 1/2002 | Shimizu et al. |
| 6,362,291 B1 | 3/2002 | Shimizu et al. |

* cited by examiner

POLYMER SCALE PREVENTIVE AGENT

BACKGROUND OF THE INVENTION

1. Field of the Invention

The present invention relates to a polymer scale preventive agent for preventing the adhesion of polymer scale to the inner wall surfaces and the like of a polymerization vessel during the production of a polymer by polymerizing a monomer containing an ethylenic double bond in a polymerization vessel.

2. Description of the Prior Art

It is already known that when a monomer containing an ethylenic double bond is polymerized, some of the polymer adheres as scale to the inner wall surfaces and the like of the polymerization vessel.

This adhesion of polymer scale becomes more marked as the number of polymerization batches increases, and causes a reduction in the polymer yield, and a lowering of the cooling capabilities inside the polymerization vessel. Furthermore, another problem arises in that polymer scale that has dislodged from the inner wall surfaces of the polymerization vessel can contaminate the polymer, causing a reduction in the quality of the product. The operation of removing polymer scale that has adhered to the inner wall surfaces and the like of the polymerization vessel not only requires a great deal of time and effort, but is also dangerous, as unreacted monomer incorporated within the polymer scale can harm the human body.

Conventionally, in order to prevent the adhesion of polymer scale to the inner wall surfaces and the like of the polymerization vessel during the polymerization of a monomer containing an ethylenic double bond, a method is used wherein a polymer scale preventive agent is applied to the polymerization vessel inner wall surfaces and the stirrer and the like, thus forming a coating. Known examples of this type of polymer scale preventive agent include mixtures of a condensation reaction product of a naphthol and an aldehyde, with an inorganic colloid (and an additional water-soluble polymer compound) (U.S. Pat. No. 5,576,370), and mixtures of a reaction product of sodium hydroxymethanesulfonate and a naphthol, with a polyvinyl alcohol (WO96/39446 and WO97/08210).

However, it has become clear that a polymer scale preventive coating formed using a polymer scale preventive agent disclosed in the above patent reference 1 does not provide a satisfactory polymer scale prevention effect in the vicinity of the gas-liquid interface inside the polymerization vessel, particularly in the case of polymerization reactions conducted at a polymerization temperature of 60° C. or higher. In addition, if the number of polymerization batches reaches a value of 150 batches or more, then the polymer scale adhered in the vicinity of the gas-liquid interface begins to grow, and as the extent of that growth increases, the scale becomes more likely to dislodge and contaminate the product polymer, causing fish eyes within the polymer product.

Furthermore, as the number of polymerization batch repetitions increases, the polymer scale preventive agent is typically reapplied to the internal surfaces and the like of the polymerization vessel, and as a result, the scale preventive agent layer grows gradually thicker, and portions of the layer can separate and contaminate the product polymer, causing discoloration problems such as the appearance of colored particles within the polymer product, or yellowing of the product following molding. This phenomenon is known as initial discoloration.

SUMMARY OF THE INVENTION

An object of the present invention is to provide a polymer scale preventive agent for use in the production of a polymer by polymerizing a monomer containing an ethylenic double bond, wherein formation of a polymer scale preventive coating (hereafter referred to as a "scale preventive coating") on the inner wall surfaces and the like of the polymerization vessel can be completed with a single-stage application of the polymer scale preventive agent, thus enabling an improvement in productivity, and the formed scale preventive coating exhibits a favorable polymer scale prevention effect and reduces the contamination of the polymer product with dislodged scale or colored particles, even for polymerization reactions conducted at a high temperature of approximately 60° C. or higher, and even if the number of polymerization batches increases to 150 batches or more, and as a result, the quality of the product can be improved, with significant reductions in the occurrence of fish eyes and initial discoloration.

As a result of intensive investigation aimed at achieving the above object, the inventors of the present invention were able to complete the present invention.

In other words, the present invention provides a polymer scale preventive agent (hereafter referred to as a "scale preventive agent") for use in the polymerization of at least one monomer containing an ethylenic double bond, comprising: (A) a condensation reaction product obtained by reacting an aldehyde compound and a hydroxynaphthalene-based compound in the presence of a reducing agent, and (B) a polymer compound containing a nitrogen atom.

A scale preventive agent of the present invention is capable of forming a scale preventive coating with satisfactory scale prevention properties with a single-stage application, enabling the process time required to be shortened, and the productivity to be improved, and even if a plurality of polymerization batches are conducted under high temperature polymerization reaction conditions, the adhesion of polymer scale can be effectively prevented, not only on the walls within the liquid phase section of the polymerization vessel, but also in the vicinity of the gas-liquid interface, on the stirring device, and on the baffle surfaces that oppose the wall surfaces. As a result, not only can the contamination of the polymer by colored particles be reduced significantly in comparison with conventional agents, but molded products such as sheets formed using the polymer display extremely small quantities of fish eyes, and excellent anti-initial discoloration, thus enabling the production of polymer products of improved quality.

DETAILED DESCRIPTION OF THE PREFERRED EMBODIMENTS

Figure 1:
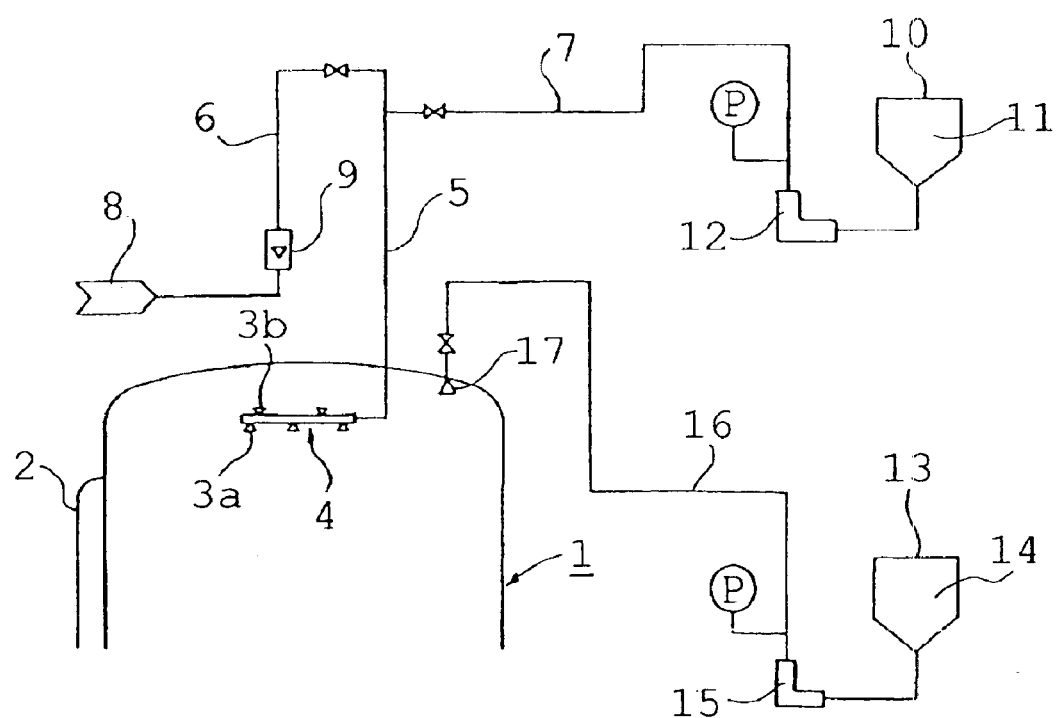
FIG. 1 is a drawing showing a schematic illustration of an apparatus used in the formation of a scale preventive coating using a scale preventive agent of the present invention.

As follows is a description of specifics of the present invention. In this specification, the term "initial discoloration" refers to discoloration that occurs when a polymer product is formed under heating and pressure, and the term "anti-initial discoloration" refers to resistance to this type of initial discoloration.

[(A) Condensation Reaction Product]

The aforementioned component (A) is a condensation reaction product obtained by reacting an aldehyde compound and a hydroxynaphthalene-based compound, in a solvent and in the presence of a reducing agent.

The condensation reaction for obtaining the component (A) is described below in detail.

Aldehyde Compound

There are no particular restrictions on the aldehyde compound that represents a reaction raw material for the component (A), provided it is an organic compound containing an aldehyde group (—CHO). Suitable examples of this aldehyde compound include formaldehyde, acetaldehyde, propionaldehyde, butyraldehyde, acrolein, crotonaldehyde, benzaldehyde, furfural, phenylacetaldehyde, 3-phenylpropionaldehyde, and 2-phenylpropionaldehyde. These compounds can be used singularly, or in combinations of two or more different compounds.

Of the aldehyde compounds listed above, formaldehyde and acetaldehyde are preferred from industrial and economic viewpoints.

Hydroxynaphthalene-based Compound

There are no particular restrictions on the hydroxynaphthalene-based compound that represents a reaction raw material for the component (A), provided it is an organic compound containing a naphthalene ring skeleton, in which at least one of the hydrogen atoms bonded to the carbon atoms that form the ring skeleton has been substituted with a hydroxyl group. Suitable examples of this hydroxynaphthalene-based compound include 1-naphthol, 2-naphthol, 1,3-dihydroxynaphthalene, 1,5-dihydroxynaphthalene, 1,7-dihydroxynaphthalene, 6-hydroxy-2-naphthoic acid, 2-hydroxy-1-naphthoic acid, 1-hydroxy-2-naphthoic acid, and 8-hydroxy-1-naphthoic acid. These compounds can be used singularly, or in combinations of two or more different compounds.

Of the hydroxynaphthalene-based compounds listed above, 1-naphthol and 2-naphthol are preferred.

Raw Material Proportions

The relative proportions of the aldehyde compound and the hydroxynaphthalene-based compound supplied to the condensation reaction may need to be adjusted in accordance with factors such as the nature of the two compounds, the type of solvent and catalyst used, and the condensation reaction conditions, and although definitive proportions can therefore not be given, the number of mols of aldehyde groups (—CHO) contained within the aldehyde compound is typically within a range from 0.1 to 10 mols, and preferably from 0.5 to 5 mols, per 1 mol of hydroxyl groups contained within the hydroxynaphthalene-based compound.

Condensation Reaction Solvent

The solvent used during the condensation reaction of the two reaction raw materials described above is water, an organic solvent, or a mixture thereof.

There are no particular restrictions on the organic solvent, provided it is capable of dissolving the two reaction raw materials to form a homogeneous solution, although water-soluble organic solvents are preferred. Examples of such organic solvents include alcohols such as methanol, ethanol, and propanol; ketones such as acetone and methyl ethyl ketone; esters such as methyl acetate and ethyl acetate; and compounds represented by a general formula (1) shown below:

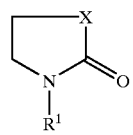

(1)

(wherein, $R^1$ represents an alkyl group of 1 to 3 carbon atoms, and X represents a methylene group (—$CH_2$—) or a bivalent group represented by a formula: —$NR^2$— (wherein, $R^2$ represents an alkyl group of 1 to 3 carbon atoms)). These solvents can be used singularly, or as mixed solvents containing two or more different solvents. Furthermore, as described above, mixed solvents containing an organic solvent and water can also be used.

In the above general formula (1), $R^1$ is an alkyl group of 1 to 3 carbon atoms, and examples include a methyl group, ethyl group, propyl group or isopropyl group, although of these, a methyl group is preferred. In those cases where X is a group represented by a formula: —$NR^2$—, $R^2$ is the same type of alkyl group as that described for $R^1$, and a methyl group is preferred.

Specific examples of the compounds represented by the above general formula (1) include N-methyl-2-pyrrolidone, N,N'-dimethyl-2-imidazolidone, N-ethyl-2-pyrrolidone, N,N'-diethyl-2-imidazolidone, N-propyl-2-pyrrolidone, and N,N'-dipropyl-2-imidazolidone, and of these, N-methyl-2-pyrrolidone and N,N'-dimethyl-2-imidazolidone are preferred. As described above, these compounds can be used singularly, or in combinations of two or more different compounds.

Of the solvents described above, compounds represented by the above general formula (1), and particularly N-methyl-2-pyrrolidone and N,N'-dimethyl-2-imidazolidone, or mixtures thereof, or alternatively mixed solvents containing a compound represented by the general formula (1) and water, are preferred. The reason for this preference is that such solvents offer good solubility of the hydroxynaphthalene-based raw material, and also enable a homogeneous solution of the condensation reaction product to be obtained at the completion of the condensation reaction, with no precipitation, and consequently contamination of the polymer product with precipitated material derived from the condensation reaction can be effectively prevented.

In those cases where a mixed solvent of a compound represented by the general formula (1) and water is used, there are no particular restrictions on the relative proportions used, although typically, from 2 to 500 parts by weight, and preferably from 5 to 200 parts by weight, of the compound represented by the general formula (1) are used per 100 parts by weight of water.

Furthermore, there are no particular restrictions on the total quantity of solvent used, provided the solvent is capable of dissolving the two reaction raw materials to form a homogeneous solution, and is also capable of producing a homogeneous solution of the condensation reaction product at the completion of the condensation reaction, although typically, from 2 to 500 parts by weight, and preferably from 5 to 200 parts by weight, of the solvent are used per 100 parts by weight of the combination of the two reaction raw materials.

Reducing Agent

In the present invention, conducting the production of the condensation reaction product of the aldehyde compound and the hydroxynaphthalene-based compound in the presence of a reducing agent is an essential requirement.

In the above condensation reaction, the reducing agent can be added to the reaction system prior to commencement of the condensation reaction, during the condensation reaction, or at both these stages, but is preferably added prior to commencement of the condensation reaction. By conducting the condensation reaction in the presence of the reducing agent, the stability of the homogeneity of the solution of the condensation reaction product improves, and gels are not generated even on long-term storage of the solution, thereby effectively preventing the contamination of polymer products by such gels, and removing the resulting deleterious effects on the product quality. In addition, the use of the reducing agent offers an additional advantage in that it improves the scale prevention effect of the scale preventive coating generated from the scale preventive agent of the present invention.

The phrase "prior to commencement of the condensation reaction" means following the preparation of the solution containing the two reaction raw materials, but prior to the completion of the process of raising the temperature of the reaction system from room temperature to a predetermined reaction temperature. Furthermore, the phrase "during the condensation reaction" means after the temperature of the reaction system has reached the predetermined reaction temperature, but before the condensation reaction has completed, while the reaction system still contains unreacted raw material.

Examples of the reducing agent include sulfites, phosphites, nitrites, reducing sugars, and thiourea dioxide.

Specific examples of suitable sulfites include ammonium sulfite, potassium sulfite, sodium sulfite, ammonium bisulfite, sodium bisulfite, sodium dithionite ($Na_2S_2O_4$), and rongalite.

Specific examples of suitable phosphites include ammonium phosphite, sodium phosphite, potassium phosphite, calcium phosphite, uranyl phosphite, cobalt phosphite, ferrous phosphite, ferric phosphite, copper phosphite, barium phosphite, hydrazinium phosphite, ammonium biphosphite, sodium biphosphite, potassium biphosphite, calcium biphosphite, cobalt biphosphite, cuprous biphosphite, cupric biphosphite, ferrous biphosphite, ferric biphosphite, lead biphosphite, barium biphosphite, magnesium biphosphite, manganese biphosphite, and hydrazinium biphosphite.

Specific examples of suitable nitrites include ammonium nitrite, sodium nitrite, potassium nitrite, calcium nitrite, zinc nitrite, silver nitrite, cobalt potassium nitrite, cobalt sodium nitrite, strontium nitrite, cesium nitrite, cerium nitrite, cupric nitrite, nickel nitrite, barium nitrite, magnesium nitrite, lithium nitrite, and rubidium nitrite.

Examples of suitable reducing sugars include sugars with a free aldehyde group or carbonyl group, which also display reducing properties. Specific examples include maltose, lactose, and grape sugar (glucose).

The sulfites, phosphites, nitrites, reducing sugars, or thiourea dioxide described above can each be used singularly, or in combinations of two or more materials of the same type. Furthermore, combinations of two or more different types of reducing agent, such as mixtures of a sulfite and a phosphite, can also be used.

Furthermore, of the reducing agents described above, sulfites and thiourea dioxide are preferred.

When used, the quantity added of the reducing agent is typically within a range from 0.01 to 10 parts by weight, and preferably from 0.1 to 3 parts by weight, per 100 parts by weight of the combination of the two reaction raw materials. By ensuring that the quantity of the reducing agent falls within the above range, the condensation reaction product can be obtained as a homogeneous, stable solution, with no gels being formed during the condensation reaction, and a scale preventive agent with excellent scale prevention properties can be formed.

Condensation Reaction

In the condensation reaction, the two reaction raw materials described above are dissolved uniformly within the aforementioned solvent, and the reaction is then conducted in the presence of the aforementioned reducing agent, under temperature conditions that are typically within a range from room temperature to 200° C., and preferably from 30 to 150° C. The time required for the condensation reaction may require adjusting depending on the total weight of the two reaction raw materials, but is typically within a range from 2 to 100 hours, and preferably from 3 to 30 hours.

A catalyst is preferably used in the condensation reaction described above. This catalyst can use an acidic catalyst such as sulfuric acid, hydrochloric acid, perchloric acid, p-toluenesulfonic acid, methanesulfonic acid or trifluoromethanesulfonic acid; or a basic catalyst such as sodium hydroxide, potassium hydroxide or ammonium hydroxide. There are no particular restrictions on the quantity of catalyst used, and any catalytically effective quantity is suitable, although typical quantities are within a range from 1 to 20 parts by weight, and preferably from 2 to 15 parts by weight, per 100 parts by weight of the combination of the two reaction raw materials. A quantity within the above range is advantageous economically, and yet is still capable of satisfactorily accelerating the condensation reaction.

Furthermore, there are no particular restrictions on the pH conditions within the reaction system for the condensation reaction, although typical pH values are within a range from 1 to 13, and preferably from 7 to 13. Where required, pH regulating agents can also be added to the reaction system, and there are no particular restrictions on the particular agent used, nor on the quantity added.

The above condensation reaction enables the condensation reaction product of the aldehyde compound and the hydroxynaphthalene-based compound to be obtained in the form of a homogeneous solution. Subsequently, the solvent and the like are removed from the solution, yielding the condensation reaction product that represents the component (A) of the present invention. The solvent may also be used, as is, in the preparation of the scale preventive agent of the present invention, provided the solvent does not impair the preparation of the scale preventive agent in any way. Such cases offer the additional advantage of a simplified production process.

[(B) Polymer Compound Containing a Nitrogen Atom]

A major characteristic of a scale preventive agent of the present invention is the combination of a polymer compound containing a nitrogen atom (B) with the condensation reaction product of the component (A) described above. This combination enables a scale preventive coating with a markedly superior scale prevention effect to be formed with a single-stage application, thus enabling the production of polymer products with absolutely no quality problems.

Examples of the polymer compound containing a nitrogen atom of the component (B) include polyethyleneimine, polyacrylamide, N-vinyl-2-pyrrolidone/acrylamide copolymers, cyclic polymers of dimethyldiamylammonium chloride, cyclic polymers of dimethyldiethyldiamylammonium chloride, cyclic polymers of diallylamine hydrochloride, cyclic copolymers of dimethyldiallylammonium chloride and sulfur dioxide, polyvinylpyridine, polyvinylpyrrolidone, polyvinylcarbazole, polyvinylimidazoline, polydimethylaminoethyl acrylate, polydiethylaminoethyl acrylate, and derivatives and modifications of these polymers, including partially cross-linked products, copolymers, graft copolymers, and polymers in which functional groups such as —OH, —NH$_2$, —COOH, and —SO$_3$H have been introduced into the above polymers. The components (B) can be used singularly, or in combinations of two or more different polymers.

Of the above materials, the use of polyvinylpyrrolidone provides an improved scale prevention effect, and is consequently preferred. If polyvinylpyrrolidone is used, then polymers for which the weight average molecular weight is typically within a range from 3,000 to 5,000,000, and preferably from 6,000 to approximately 3,000,000, are the most effective.

The quantity used of the component (B) is typically within a range from 1 to 100 parts by weight, and preferably from 5 to 50 parts by weight, per 100 parts by weight of the condensation reaction product of the component (A). Quantities within the above range are preferred, as they enable ready formation of a scale preventive coating with a uniform and adequate thickness, which displays an excellent scale prevention effect.

[(C) Inorganic Colloids, Non-Colloidal Alkali Metal Silicates]

In addition to the component (A) and the component (B) described above, a scale preventive agent of the present invention may also comprise (C) at least one material selected from a group consisting of inorganic colloids and non-colloidal alkali metal silicates. Incorporating this component (C) can strengthen the adhesion of the scale preventive coating to the inner wall surfaces of the polymerization vessel, further improving the scale prevention effect, and this is desirable in some cases.

Examples of inorganic colloids include oxide colloids of metals such as aluminum, thorium, titanium, zirconium, antimony, tin, and iron; hydroxide colloids of the same metals; elemental colloids of selenium, sulfur, gold, and silver; and colloids of compounds such as silica, tungstic acid, vanadium pentoxide, and silver iodide. These colloids can be used singularly, or in combinations of two or more different materials. Preferred colloids amongst the above materials include oxides of aluminum, titanium, antimony, tin, and iron, hydroxides of the same metals, and colloidal silica.

There are no particular restrictions on the method of producing these inorganic colloids, and either dispersion methods using water as the dispersion medium, or aggregation methods which produce particulate colloids are suitable. There are no particular restrictions on the size of the colloid particles, although sizes are typically within a range from 1 to 500 nm, and preferably from 4 to 100 nm.

Examples of alkali metal silicates include metasilicates: $M_2SiO_3$ (wherein, M represents an alkali metal, this abbreviation also applies below), orthosilicates: $M_4SiO_4$, bisilicates: $M_2Si_2O_3$, trisilicates: $M_3Si_3O_7$, and sesquisilicates: $M_4Si_3O_{10}$ and the like of alkali metals such as lithium, sodium and potassium; as well as solid water glass: $Na_2O\cdot nSiO_2$ (wherein, n is a positive number from 2 to 4). These materials can be used singularly, or in combinations of two or more different materials. Of these, solid water glass: $Na_2O\cdot nSiO_2$ is preferred.

In those cases where a component (C) is added, the quantity of the component (C) is typically within a range from 0.1 to 100 parts by weight, and preferably from 1 to 50 parts by weight, per 100 parts by weight of the condensation reaction product of the component (A).

[Preparation of a Scale Preventive Agent]

In order to prepare a scale preventive agent, the component (A) may be mixed with a solution of the component (B), for example. Alternatively, the solution of the condensation reaction product obtained in the condensation reaction for the component (A) can be used, as is, and simply combined with a solution of the component (B). Furthermore, where necessary, the optional component (C) may also be added during this mixing process.

In order to prepare a solution of the component (B), either water, or a mixture of water and a hydrophilic organic solvent that is miscible with water is used as the solvent. Suitable examples of the hydrophilic organic solvent include alcohols such as methanol, ethanol, and propanol; ketones such as acetone and methyl ethyl ketone; esters such as methyl acetate and ethyl acetate; and compounds represented by the general formula (1) shown above such as N-methyl-2-pyrrolidone and N,N'-dimethyl-2-imidazolidone. These solvents can be used singularly, or as mixed solvents containing two or more different solvents.

Of the above solvents, water, mixed solvents containing water and an alcohol-based solvent, or mixed solvents containing water and a compound represented by the above general formula (1) are preferred in terms of the solubility of the component (B), and the comparatively low odor levels.

In those cases where a mixed solvent of water and a hydrophilic organic solvent is used, the quantity of the hydrophilic organic solvent is preferably restricted to a quantity which reduces the possibility of precipitation of the dissolved components as a result of variation in the concentration caused by volatilization of the hydrophilic organic solvent, reduces the danger levels in terms of flammability and toxicity, and ensures safe handling of the solvent. Specifically, in a mixed solvent with water, the quantity of the hydrophilic organic solvent is preferably no more than 50% by weight, and is even more preferably 30% by weight or lower.

Furthermore, during preparation of the solution of the component (B), pH regulating agents such as sodium hydroxide, potassium hydroxide and ethylenediamine may also be added if required.

The concentration of the component (B) within the solution of the component (B) must be adjusted in accordance with the nature of the component (B) used, although the concentration is typically within a range from 1.0 to 15% by weight, and preferably from 2.0 to 10% by weight.

Using the method outlined above, a scale preventive agent comprising each of the above components can be produced as a homogeneous liquid, and there are no particular restrictions on the actual mixing operation. The mixing apparatus can employ a conventional apparatus, and a suitable example is an apparatus comprising a reaction vessel equipped with a stirrer and a heating jacket.

The homogeneous liquid of the scale preventive agent of the present invention obtained in this manner is used as a coating liquid for application to the inner wall surfaces and the like of the polymerization vessel.

Because it is desirable to ensure no precipitation of the condensation product, the content of solid, including the aforementioned components (A) and (B), or, if the component (C) is present, the components (A) to (C), within this coating liquid is typically within a range from 4 to 25% by weight, and preferably from 8 to 20% by weight.

Furthermore, because it is desirable to ensure a level of alkalinity that prevents precipitation of the condensation product, the pH of the coating liquid is typically within a range from 9 to 13.5, and preferably from 10.5 to 13.0. If necessary, this pH value can be set by regulating the quantity of a pH regulating agent such as sodium hydroxide, potassium: hydroxide or ethylenediamine.

[Formation of a Scale Preventive Coating]

A process for forming a scale preventive coating using a scale preventive agent of the present invention is described with reference to FIG. 1. There are no particular restrictions on the method used for applying the scale preventive agent of the present invention, although a method that uses steam as a carrier to apply the agent to the inner wall surfaces and the like of the polymerization vessel is preferred. FIG. 1 is a schematic illustration of an apparatus used for forming a scale preventive coating.

Steam Carrier

The steam used as the carrier for the coating liquid may be either normal saturated steam or superheated steam, and displays a pressure that is typically within a range from 0.196 to 3.43 MPa·G (2 to 35 kgf/cm$^2$·G), and preferably from 0.196 to 1.96 MPa·G (2 to 20 kgf/cm$^2$·G). The steam temperature is typically within a range from 120 to 260° C., and preferably from 130 to 200° C.

The above pressure and temperature values for the steam refer to values measured prior to mixing of the steam with the application liquid, such as within a steam supply line 6 shown in FIG. 1.

Application Process

Step 1. (Preheating of the Inner Wall Surfaces and the like of the Polymerization Vessel with Steam)

Hot water or the like is passed through a jacket 2 fitted to a polymerization vessel 1 to preheat the inner wall surfaces of the polymerization vessel to a temperature of at least 50° C., and preferably from 50 to 95° C. A coating ring 4 formed from a ring-shaped pipe and comprising downward directed nozzles 3a and upward directed nozzles 3b is provided in the upper section of the polymerization vessel. A line 5 through which a combination of the steam and the coating liquid can be supplied from a position outside the polymerization vessel 1 is connected to the coating ring 4.

A steam supply line 6 and a coating liquid supply line 7 are connected to the line 5 via respective valves. If necessary, solely steam supplied from the steam supply line 6 and the line 5 can be blown into the polymerization vessel from the coating nozzles 3a, 3b of the coating ring 4 to preheat the baffle (not shown in the drawing) and stirring blades (not shown in the drawing) housed within the polymerization vessel. In this apparatus, the steam is supplied to the coating ring 4 from a steam feeder 8, through a flow meter 9, the line 6, and the line 5.

Step 2. (Application of Scale Preventive Agent)

Steam is supplied to the coating ring 4, and a coating liquid 11 housed in a coating liquid tank 10 is also supplied to the coating ring 4 through the line 7 and the line 5, using a pump 12 or an aspirator valve (not shown in the drawing). In the drawing, the letter P represents a pressure gauge. The coating liquid forms a combined mist with the steam, and is applied in this form to the surfaces that the monomer contacts during the polymerization reaction, such as the inner wall surfaces of the polymerization vessel, the baffle surfaces, and the surfaces of the stirring blades. At the same time as this application, the coating liquid undergoes simultaneous drying on the coated surfaces, thus forming a scale preventive coating. Accordingly, a separate drying operation is unnecessary.

The mixing ratio (L/G) between the steam (G) and the coating liquid (L) in the line 5, reported as a flow rate ratio (weight referenced) per unit time, is typically within a range from 0.005 to 0.8, and is preferably controlled to a ratio within a range from 0.01 to 0.2. By ensuring that the mixing ratio falls within this range, the above mist can be formed in a state that is ideal for forming the scale preventive coating on the polymerization vessel inner wall surfaces and the like.

Step 3. (Water Washing)

Once supply of the steam and the coating liquid has been stopped, the inside of the polymerization vessel 1 is washed with cleaning water 14 housed in a water tank 13. The cleaning water is supplied to the polymerization vessel from a nozzle 17, having been fed through a line 16 using a pump 15. In those cases where the state of the formed coating is favorable, and unlikely to affect the quality of the polymer product even if the water washing step is omitted, the water washing is unnecessary, meaning the process can be simplified and the productivity improved.

The weight (following drying) of a scale preventive agent coating formed by the above steps is typically within a range from 0.0005 to 3 g/m$^2$, and preferably from 0.0005 to 1 g/m$^2$. By ensuring the coating weight falls within this range, a coating of satisfactory thickness is formed on the polymerization vessel inner wall surfaces and the like, and a favorable scale prevention effect can be achieved. In addition, the problems that accompany the dislodging of the coating film from the polymerization vessel inner wall surfaces and the like can be suppressed.

[Polymerization]

The scale preventive agent of the present invention is used in polymerization reactions of at least one monomer containing an ethylenic double bond. Examples of this monomer include vinyl halides such as vinyl chloride; vinylidene halides such as vinylidene chloride; vinyl esters such as vinyl acetate and vinyl propionate; acrylic acid, methacrylic acid and esters or salts thereof; maleic acid, fumaric acid and esters or anhydrides thereof; conjugated diene-based monomers such as butadiene, chloroprene, and isoprene; styrene; acrylonitrile; and vinyl ether.

Examples of processes to which scale preventive agents of the present invention are particularly suited include processes for the production of polymers or copolymers of vinyl halides or vinylidene halides such as vinyl chloride and vinylidene chloride, or of monomer mixtures comprising mainly these monomers, either by suspension polymerization or emulsion polymerization in an aqueous medium.

Scale preventive coatings formed from a scale preventive agent of the present invention display a high level of durability even when applied to the polymerization of monomers such as α-methylstyrene, (meth)acrylate esters, acrylonitrile, and vinyl acetate, which have been shown to display powerful dissolution of conventional scale preventive coatings, and can consequently be favorably applied to the production of polymer beads or latex formed from polystyrene, polymethyl methacrylate, and polyacrylonitrile and the like; the production of synthetic rubbers such as SBR, NBR, CR, IR, and IIR (these synthetic rubbers are normally produced by emulsion polymerization); and the production of ABS resins.

During the polymerization of one or more of these monomers, the object of preventing scale can be achieved with good effectiveness regardless of whether the polymerization method employs suspension polymerization, emulsion polymerization, bulk polymerization, or solution polymerization, and even in the presence of additives such as emulsifiers, stabilizers, lubricants, plasticizers, pH regulating agents, and chain transfer agents. For example, in the case of the suspension polymerization or emulsion polymerization of a vinyl-based monomer, various additives may be added to the polymerization system as is deemed necessary.

Examples of these additives include suspension stabilizers such as partially saponified polyvinyl alcohol and methyl cellulose; anionic emulsifiers such as sodium lauryl sulfate; nonionic emulsifiers such as sorbitan monolaurate and polyoxyethylene alkyl ether; stabilizers such as tribasic lead sulfate, calcium stearate, dibutyltin dilaurate and dioctyltin mercaptide; chain transfer agents such as trichloroethylene and mercaptans; and any of the various pH regulating agents. By employing a scale preventive agent of the present invention, scale adhesion can be effectively prevented, even if the above types of additives exist in the polymerization system.

The pronounced polymer scale prevention effect of a scale preventive agent of the present invention is not affected by the type of polymerization initiator used, and manifests regardless of the type of polymerization initiator used. Specific examples of suitable polymerization initiators include t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl)peroxydicarbonate, dibenzoyl peroxide, diisopropylbenzene hydroperoxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, di-2-ethylhexyl diperoxyisophthalate, potassium persulfate, and ammonium persulfate.

Other conditions for the polymerization can employ conventionally used conditions, and there are no particular restrictions, provided the effects of the present invention are not impaired. Specifics of typical polymerization conditions are described below for the examples of suspension polymerization, solution polymerization and bulk polymerization, although the conditions are not necessarily restricted to the values listed below.

In the case of suspension polymerization, water and a dispersant are first placed in a polymerization vessel, and a polymerization initiator is then added. Subsequently, the inside of the polymerization vessel is either evacuated to reduce the pressure to a value within a range from approximately 0.001 to 101 kPa·G (approximately 0.01 to 760 mmHg), or set at atmospheric pressure, and sufficient monomer is then added to raise the polymerization internal pressure to a value that typically falls within a range from 49 to 2940 kPa·G (0.5 to 30 kgf/cm$^2$·G). Polymerization is then conducted at a reaction temperature of 30 to 150° C. During polymerization, one or more of water, a dispersant, and a polymerization initiator may be added if required. The reaction temperature during polymerization varies depending on the monomer undergoing polymerization, and in the case of a vinyl chloride polymerization, the polymerization is conducted at 30 to 80° C., whereas in the case of a styrene polymerization, the polymerization is conducted at 50 to 150° C. The polymerization is deemed completed either when the internal pressure of the polymerization vessel has dropped to a value within a range from 0 to 686 kPa·G (0 to 7 kgf/cm$^2$·G), or when the difference between the inlet temperature and the outlet temperature of the cooling water flowing through the cooling jacket fitted around the exterior of the polymerization vessel has substantially disappeared (that is, when heat generation from the polymerization reaction has subsided). The quantities of water, the dispersant and the polymerization initiator added in the polymerization are typically within ranges from 20 to 500 parts by weight for water, from 0.01 to 30 parts by weight for the dispersant, and from 0.01 to 5 parts by weight for the polymerization initiator, relative to 100 parts by weight of the monomer.

In the case of solution polymerization, an organic solvent such as toluene, xylene or pyridine is used instead of water as the polymerization medium. A dispersant can be used if required. The other polymerization conditions are generally the same as those described above for suspension polymerization.

In the case of bulk polymerization, the inside of the polymerization vessel is either evacuated to reduce the pressure to a value within a range from approximately 0.001 to 101 kPa·G (approximately 0.01 to 760 mmHg), or set at atmospheric pressure, the monomer and the polymerization initiator are added to the polymerization vessel, and the polymerization is then conducted at a reaction temperature of −10 to 250° C. In the case of a vinyl chloride polymerization, the polymerization is conducted at 30 to 80° C., whereas in the case of a styrene polymerization, the polymerization is conducted at 50 to 15° C.

EXAMPLES

As follows is a more detailed description of the present invention, based on a series of examples and comparative examples.

Those entries denoted with an *, for example in the "Coating liquid No." column of Table 1, refer to comparative examples that do not satisfy the conditions of the present invention, whereas the other entries refer to examples.

In the following description, "parts" refers to "parts by weight". Furthermore, the entries under "condensation product (A)" in Table 1 refer to condensation reaction products between an aldehyde compound and a hydroxynaphthalene-based compound of the aforementioned component (A). The entries under "Auxiliary agent (B)" refer to polymer compounds containing a nitrogen atom. The entries under "Auxiliary agent (C)" refer to an inorganic colloid or an alkali metal silicate of the component (C). The terms (A), (B) and (C) within Table 1 and Table 2 refer to the components in accordance with the previous description. This also applies for Table 3 and Table 4.

[Preparation of Condensation Reaction Products]

In the following preparatory examples for the condensation reaction products of the component (A), the weight average molecular weight of the obtained condensation product was measured in the manner described below.

Measurement of weight average molecular weight

Gel permeation chromatography (GPC) was used to measure the polystyrene equivalent weight average molecular weight, under the conditions described below.

Columns: guard column brand name: shim-pack GPC-800DP (manufactured by Shimadzu Corporation)

analysis columns brand name: shim-pack GPC-803D, 802D (manufactured by Shimadzu Corporation)

Carrier: LiBr/DMF=10 mmol/L

Flow rate: 1.0 mL/minute

Detector: ultraviolet absorption spectrum (wavelength= 290 nm)

Temperature: 60° C.

Preparatory Example 1

Preparation of Condensation Product No. 1
(Comparative Preparatory Example Using No
Reducing Agent)

A pressure-resistant polymerization vessel was charged with 36.0 kg (250 mols) of 1-naphthol and 180 L of a 1N aqueous solution of NaOH (NaOH content: 7.2 kg (180 mols)), and with the mixture undergoing constant stirring, the temperature was raised to 70° C. Subsequently, 19.75 kg of an aqueous solution of dissolved formaldehyde (containing 1.92% by weight of formaldehyde) was added dropwise to the reaction mixture at a constant rate, over a period of 1.5 hours. During the period up until completion of this dropwise addition, the internal temperature of the reaction vessel was regulated so as not to exceed 80° C. Subsequently, the stirring of the polymerization mixture was continued for a further 3 hours, and during this period the temperature was lowered to 60° C. The temperature of the reaction mixture was then raised to 98° C., and reaction was continued at 98° C. for 1.5 hours. The reaction mixture was then cooled, yielding an alkaline solution of the condensation reaction product (condensation product No. 1).

The solvent was then removed from the cooled reaction mixture, and the residue was washed, and then dried under reduced pressure at 50° C. Measurement of the weight average molecular weight of the condensation product No. 1 revealed a result of 2,400.

Preparatory Example 2

Preparation of Condensation Product No. 2 (Water Solvent System, Reducing Agent Used)

A pressure-resistant polymerization vessel was charged with 36.0 kg (250 mols) of 1-naphthol and 180 L of a 1N aqueous solution of NaOH (NaOH content: 7.2 kg (180 mols)), and with the mixture undergoing constant stirring, the temperature was raised to 70° C. Subsequently, 19.75 kg of an aqueous solution of dissolved formaldehyde (containing 1.92% by weight of formaldehyde) was added dropwise to the reaction mixture at a constant rate, over a period of 1.5 hours. Immediately following completion of the dropwise addition of the formaldehyde, 17.25 kg of a 20% by weight aqueous solution of sodium nitrite (sodium nitrite content: 50 mols) was added dropwise at a constant rate, over a period of 0.1 hours. During this period, the internal temperature of the reaction vessel was regulated so as not to exceed 80° C. Subsequently, the stirring of the polymerization mixture was continued for a further 3 hours, and during this period the temperature was lowered to 60° C. The temperature of the reaction mixture was then raised to 98° C., and reaction was continued at 98° C. for 1.5 hours. The reaction mixture was then cooled, yielding an alkaline solution of the condensation reaction product (condensation product No. 2).

The solvent was then removed from the cooled reaction mixture, and the residue was washed, and then dried under reduced pressure at 50° C. Measurement of the weight average molecular weight of the condensation product No. 2 revealed a result of 2,300.

Preparatory Example 3

Preparation of Condensation Product No. 3 (Organic Solvent System, Reducing Agent Used)

With the exception of replacing the 180 L of 1N NaOH solution with 90 kg of N-methyl-2-pyrrolidone and 90 L of a 2N aqueous solution of NaOH (NaOH content: 7.2 kg (180 mols), preparation was conducted in the same manner as the preparatory example 2, and yielded a condensation reaction product (condensation product No. 3, weight average molecular weight 4,900).

Preparatory Example 4

Preparation of Condensation Product No. 4 (Organic Solvent System, Reducing Agent Used)

With the exceptions of replacing the 1-naphthol with 36.0 kg (250 mols) of 2-naphthol, replacing the 180 L of 1N NaOH solution with 90 kg of N-methyl-2-pyrrolidone and 90 L of a 2N aqueous solution of NaOH (NaOH content: 7.2 kg (180 mols)), and replacing the aqueous solution of formaldehyde with 24.51 L of an aqueous solution containing 980 g of dissolved furfural per liter of solution (oral content: 250 mols), preparation was conducted in the same manner as the preparatory example 2, and yielded a condensation reaction product (condensation product No. 4, weight average molecular weight 4,700).

Preparatory Example 5

Preparation of Condensation Product No. 5 (Organic Solvent System, Reducing Agent Used)

With the exceptions of replacing the 180 L of 1N NaOH solution with 90 kg of N,N'-dimethyl-2-imidazolidone and 90 L of a 2N aqueous solution of NaOH (NaOH content: 7.2 kg (180 mols)), and replacing the aqueous solution of sodium nitrite with 43.53 kg of a 20% o by weight aqueous solution of sodium dithionate (sodium dithionate content: 50 mols), preparation was conducted in the same manner as the preparatory example 2, and yielded a condensation reaction product (condensation product No. 5, weight average molecular weight 5,300).

Preparatory Example 6

Preparation of Condensation Product No. 6 (Water Solvent System, Reducing Agent Used)

With the exception of replacing the aqueous solution of sodium nitrite with 43.53 kg of a 20% by weight aqueous solution of sodium dithionate (sodium dithionate content: 50 mols), preparation was conducted in the same manner as the preparatory example 2, and yielded a condensation reaction product (condensation product No. 6, weight average molecular weight 5,400).

In the Table 1, the condensation product No. 1 through condensation product No. 6 obtained in the preparatory examples 1 through 6 respectively, are labeled, in the same order, as CP1 to CP6.

[Preparation of Coating Liquids]
Preparation of Coating Liquids No. 101 to 119

The condensation product (A), auxiliary agent (B) and auxiliary agent (C) shown below in Table 1, were used in the weight ratio (A)/(B)/(C) shown in Table 1. The auxiliary agent (B) and the auxiliary agent (C) are as specified in Table 3 and Table 4 below.

In addition, using a solvent with the composition shown in Table 2, all of the above components were mixed and dissolved. In this dissolution process, the concentration of the combined total of component (A) through component (C), and the pH, were adjusted as shown in Table 2. In this manner, a series of coating liquids No. 101 to No. 119 were obtained, each comprising the various components dissolved homogenously therein.

The coating liquid No. 102* and the coating liquid No. 103* are comparative examples using CP1, which as described above in the preparatory example 2, was prepared without using a reducing agent. The coating liquid No. 103* corresponds with the coating liquid using polyvinylpyrrolidone and colloidal silica that was used in an experiment No. 112 disclosed in Japanese Laid-open publication (kokai) No. 6-206909. Furthermore, the various polyvinylpyrrolidones and colloidal silicas are described in Table 3 and Table 4.

TABLE 1

| Coating liquid No. | Condensation product (A) | Auxiliary agent (B) | Auxiliary agent (C) | pH regulating agent | (A)(B)/(C) (weight ratio) |
|---|---|---|---|---|---|
| 101 | CP2 | a | none | NaOH | 100/10/0 |
| 102* | CP1 | a | none | NaOH | 100/10/0 |
| 103* | CP1 | a | h | NaOH | 100/50/10 |
| 104 | CP2 | b | none | NaOH | 100/10/0 |
| 105 | CP2 | c | none | NaOH | 100/10/0 |
| 106 | CP3 | c | none | KOH | 100/20/0 |
| 107 | CP3 | d | none | ethylenediamine | 100/10/0 |
| 108 | CP4 | e | none | ethylenediamine | 100/10/0 |
| 109 | CP4 | f | none | KOH | 100/10/0 |
| 110 | CP5 | f | none | KOH | 100/10/0 |
| 111 | CP6 | a | none | NaOH | 100/10/0 |
| 112 | CP2 | a | h | NaOH | 100/10/10 |
| 113 | CP2 | c | i | NaOH | 100/10/20 |
| 114 | CP3 | d | j | NaOH | 100/10/30 |
| 115 | CP3 | e | k | NaOH | 100/10/10 |
| 116 | CP4 | f | l | NaOH | 100/10/10 |
| 117 | CP4 | a | m | NaOH | 100/10/10 |
| 118 | CP5 | a | g | NaOH | 100/10/10 |
| 119 | CP6 | c | h | KOH | 100/15/20 |

*Comparative example

TABLE 2

| Coating liquid No. | (A) + (B) + (C) combined concentration (weight %) | Solvent (composition and weight ratio) | Coating liquid pH |
|---|---|---|---|
| 101 | 10 | water | 12.5 |
| 102* | 10 | water | 12.5 |
| 103* | 10 | water/acetone 90/10 | 12.5 |
| 104 | 10 | water | 12.5 |
| 105 | 10 | water | 12.5 |
| 106 | 15 | water/N-methyl-2-pyrrolidone 80/20 | 10.5 |
| 107 | 10 | water/N-methyl-2-pyrrolidone 70/30 | 10.0 |
| 108 | 8 | water/N-methyl-2-pyrrolidone 80/20 | 9.0 |
| 109 | 15 | water/N-methyl-2-pyrrolidone 80/20 | 11.0 |
| 110 | 15 | water/N,N'-dimethyl-2-imidazolidone 50/50 | 12.5 |
| 111 | 15 | water/N,N'-dimethyl-2-imidazolidone 70/30 | 12.5 |
| 112 | 15 | water | 12.5 |
| 113 | 10 | water | 12.5 |
| 114 | 10 | water/N-methyl-2-pyrrolidone 80/20 | 12.5 |
| 115 | 10 | water/N-methyl-2-pyrrolidone 80/20 | 12.5 |
| 116 | 15 | water/N-methyl-2-pyrrolidone 80/20 | 12.5 |
| 117 | 15 | water/N-methyl-2-pyrrolidone 80/20 | 12.5 |
| 118 | 15 | water/N,N'-dimethyl-2-imidazolidone 80/20 | 12.5 |
| 119 | 15 | water/N,N'-dimethyl-2-imidazolidone 80/20 | 12.5 |

*Comparative example

Auxiliary Agent (B)

The auxiliary agents (B) abbreviated as a through f in the Table 1 are described below in Table 3. (The auxiliary agents (B) a to d in the Table 3 are manufactured by ISP Japan Ltd.)

TABLE 3

| | Auxiliary agent (B) | Brand name | Weight average molecular weight |
|---|---|---|---|
| a | polyvinylpyrrolidone | K-15 | 6,000 to 15,000 |
| b | polyvinylpyrrolidone | K-30 | 40,000 to 80,000 |
| c | polyvinylpyrrolidone | K-60 | 240,000 to 450,000 |
| d | polyvinylpyrrolidone | K-90 | 900,000 to 1,500,00 |
| e | polyvinylpyrrolidone | K-120 | 2,000,000 to 3,000,000 |
| f | vinylpyrrolidone/acrylic acid copolymer | Acrylidone | 80,000 to 250,000 |

Auxiliary Agent (C)

The auxiliary agents (C) abbreviated as g through m in the Table 1 are described below in Table 4.

TABLE 4

| | Auxiliary agent (C), auxiliary agent (D) | Manufacturer (importer) | Grade (brand name) |
|---|---|---|---|
| g | colloidal silica | Nissan Chemical Industries, Ltd. | Snowtex O |
| h | colloidal silica | Nissan Chemical Industries, Ltd. | Snowtex CXS-9 |
| i | titanium oxide | Nissan Chemical Industries, Ltd. | titanium oxide sol |
| j | aluminum oxide | Nissan Chemical Industries, Ltd. | alumina sol |
| k | zirconium oxide | Nissan Chemical Industries, Ltd. | zirconium oxide sol |
| l | tin oxide | Nissan Chemical Industries, Ltd. | tin oxide sol |
| m | sodium orthosilicate | Wako Pure Chemical Industries Ltd. | sodium orthosilicate |

Examples, Comparative Examples

Using the polymerization apparatus shown in FIG. 2, the experiments described below were conducted. Those elements in FIG. 2 that correspond with an equivalent element in FIG. 1 are labeled with the same number.

Figure 2:
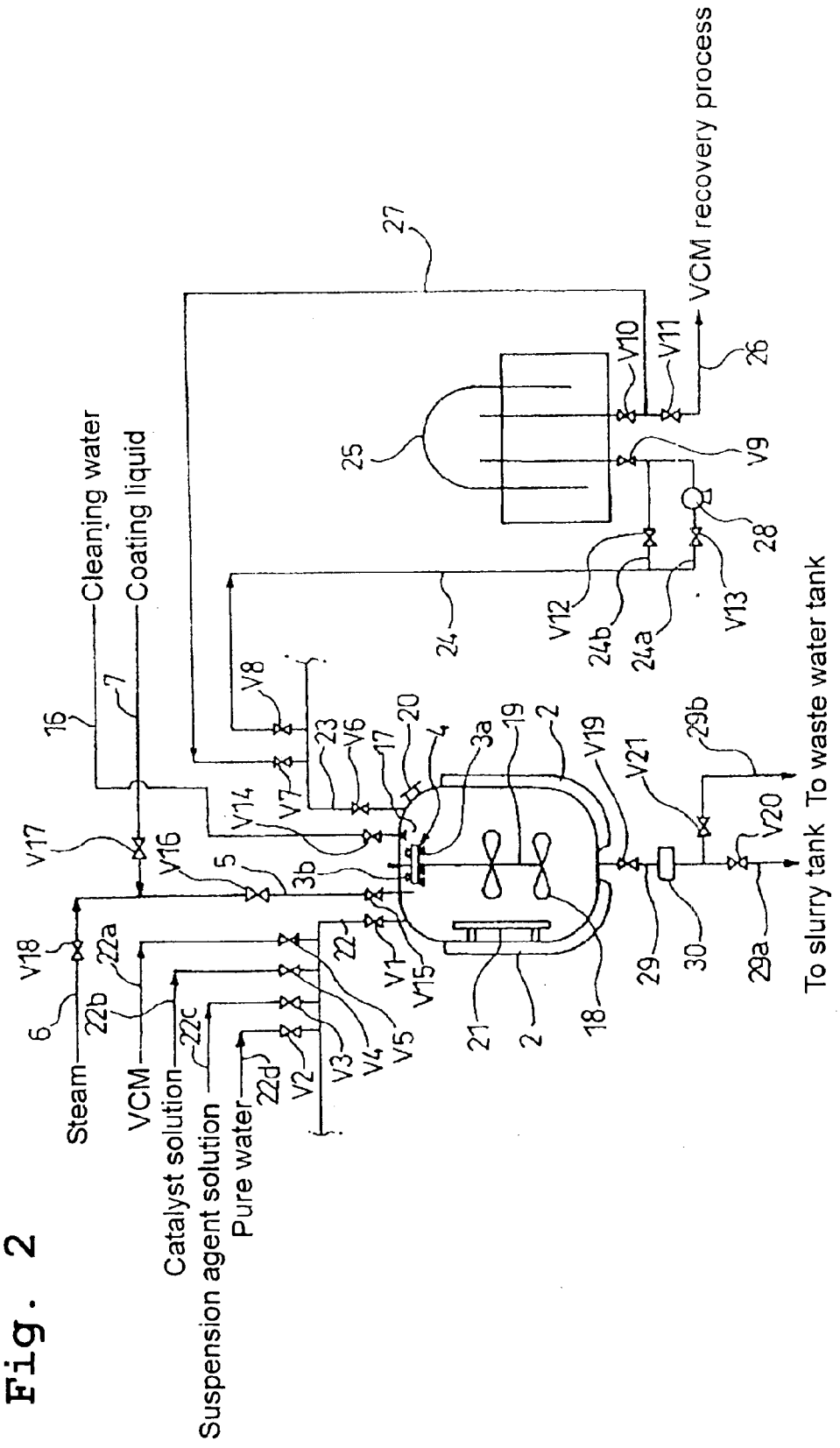
FIG. 2 is a drawing showing a schematic illustration of a polymerization apparatus used in examples for implementing a polymerization method that uses a scale preventive agent of the present invention.

In FIG. 2, a SUS 316 L stainless steel polymerization vessel 1 with an internal capacity of 2 m³ is equipped with a stirring device 19 with stirring blades 18 (the stirring motor is not shown in the drawing), a heating-cooling jacket 2, a manhole 20, a baffle 21, and other fittings (not shown in the drawing) typically provided within a polymerization vessel used for the polymerization of vinyl chloride. A line 22 connected to the upper section of the polymerization vessel 1 is a raw material supply line, and as shown in the drawing, branch lines such as a vinyl chloride monomer (hereafter abbreviated as VCM) supply line 22a, a catalyst solution supply line 22b, a suspension agent solution supply line 22c, and a pure water supply line 22d are connected to this line 22. Valves V1, V2, V3, V4 and V5 are provided within the line 22 and the lines 22a through 22d in the positions shown in the drawing.

Furthermore, a line 23 connected to the upper section of the polymerization vessel 1 is provided for evacuating the inside of the polymerization vessel 1 and recovering VCM, and is connected to a gas holder 25 via a line 24 that branches from the line 23. A VCM recovery line 26 leads out of the gas holder 25, and another line 27 that leads out of the gas holder 25 is connected to the line 23 and is used in the pressure equalization operation described below. Valves V6, V7, V8, V9, V10, V11, V12 and V13 are provided within these lines 23, 24, 26 and 27 in the positions shown in the drawing. The line 24 branches into a line 24a provided with a vacuum pump 28 used for evacuating the polymerization vessel 1 and recovering VCM, and a line 24b provided with no such pump, and these branch lines then rejoin to form a single line which is connected to the gas holder 25.

A cleaning water supply line 16 for washing the inside of the polymerization vessel with water is connected to the upper section of the polymerization vessel 1. The line 16 is provided with a valve 14 in the position shown in the drawing, and a nozzle 17 at the tip of the line that leads into the polymerization vessel 1. In addition, a coating liquid supply line 7 is connected to the upper section of the polymerization vessel 1 via a valve V17, as shown in the drawing. Furthermore, a steam supply line 6 is connected to the line 5 via a valve. A coating ring 4 fitted with coating nozzles 3a, 3b is provided at the tip of the line 5 that sits inside the polymerization vessel 1. Valves V15 and V16 are provided within these lines at the positions shown in the drawing. Furthermore, a valve V18 is provided in the steam supply line 6 in a position shown in the drawing. A line 29 is connected to the bottom of the polymerization vessel 1, and this line branches into a line 29a, which guides the polymer slurry into a slurry tank via a filter 30, and a line 29b through which coating liquid and cleaning water and the like are discharged into a waste water tank. Valves V19, V20 and V21 are provided within the lines 29, 29a and 29b respectively, in the positions shown in the drawing.

In the experiment No. 101 through experiment No. 119, a vinyl chloride polymerization was conducted in the manner described below, using the coating liquid No. 101 through coating liquid No. 119 respectively. Although the coating liquid does need to be dried following application, normally a special drying operation is not required, and in the examples of the present invention, no drying operation (process) was performed.

(1) Pretreatment of the Inside of the Polymerization Vessel

A scale preventive coating was formed on the internal walls and the like of the polymerization apparatus shown in FIG. 2, using the method outlined below. At this initial stage, all of the valves are closed.

In this pretreatment process, application of the coating liquid is conducted without passing hot water through the jacket 2 to preheat the inner wall surfaces of the polymerization vessel 1. This enables the process to be simplified.

The valves V18, V21, V19, V15 and V16 are opened, and 392 kPa·G (4 kgf/cm² G) (143° C.) of steam is blown into the polymerization vessel for 1 minute at a flow rate of 4 kg/minute, thus preheating the inside of the polymerization vessel. The valve V17 is then opened and a coating liquid containing the scale preventive agent is supplied to the polymerization vessel via the line 7 for 1 minute at a flow rate of 0.2 kg/minute. This enables the coating liquid to combine with the steam inside the line 5. The steam is used as a carrier, assisting the application of the scale preventive agent onto the polymerization vessel inner wall surfaces and the like, and simultaneously drying the coating liquid. At this point, the mixing ratio (L/G) between the steam (G) and the coating liquid (L), reported as a flow rate ratio (weight referenced), is 0.05. Subsequently, the valves V18, V21, V19, V15, V16 and V17 are closed.

The valves V14, V19, V21, V6, V7 and V10 are then opened, the inside of the polymerization vessel 1 is washed with water for 1 minute, and the cleaning water is discharged into a waste water tank M. The valves V14, V19 and V21 are then closed.

(2) Charging

The valves V1, V2 and V3 are opened, and 200 parts of pure water, 0.020 parts of partially saponified polyvinyl alcohol, and 0.026 parts of 2-hydroxypropyl methylcellulose (brand name: metholose, manufactured by Shin-Etsu Chemical Co., Ltd., degree of methoxyl group substitution: 1.9, degree of 2-hydroxypropoxyl group substitution: 0.25) are introduced into the polymerization vessel 1. The valves V1, V2, V3, V6, V7 and V10 are then closed.

Next, the valves V1 and V5 are opened, 100 parts of VCM is introduced, and the valve V5 is then closed. Subsequently, with the charged raw materials undergoing constant stirring, the valve V4 is opened, 0.03 parts of t-butyl peroxyneodecanoate is introduced, and the valves V1 and V4 are then closed.

(3) Polymerization

With the charged raw materials undergoing constant stirring, hot water is passed through the jacket 2 to raise the temperature. Once the internal temperature reaches 66° C., the supply of cooling water to the jacket 2 is commenced, and polymerization is conducted with the internal temperature maintained at 66° C. When the pressure inside the polymerization vessel has fallen to 490 kPa·G (5 kgf/cm²·G), the polymerization is terminated.

(4) Gas Discharge

The valves V6, V8, V12 and V9 are opened, and unreacted VCM is discharged into the gas holder 25 until the internal pressure in the polymerization vessel falls to substantially atmospheric pressure (101 kPa·G). Subsequently, the valves V12, V8 and V9 are closed. The valves V11 and V10 are then opened, the recovered VCM in the gas holder 25 is fed through the line 26 and into a VCM recovery device, and the valves V11 and V10 are then closed.

(5) Pressure Equalization

The valves V7 and V10 are opened, and the internal pressure of the polymerization vessel 1 and the internal pressure of the gas holder 25 are equalized.

(6) Slurry Extraction

The valves V19 and V20 are opened, and the polymer slurry is extracted from the polymerization vessel, and passed through the filter 30 and into the slurry tank. The filter 30 is a gauze type filter of 5 to 7 mesh (pore size: approximately 3 to 4 mm). In those cases where the polymer slurry contains scale that has dislodged from the polymerization vessel inner wall surfaces or the like, the scale is collected in the filter 30.

The polymer slurry extracted into the slurry tank (not shown in the drawing) is subsequently dewatered and dried, yielding a vinyl chloride polymer product. Following extraction of the polymer slurry, the valve V20 is closed.

(7) First Washing of the Polymerization Vessel Interior

The valve V21 is opened. Subsequently, the valve V14 is opened, and the inside of the polymerization vessel 1 is washed with water for 5 minutes, and the used cleaning water passes through the filter 30 and into the waste water tank. During this washing of the inside of the polymerization vessel, hot water is passed through the jacket 2 to keep the temperature of the polymerization vessel wall surfaces at 70° C. During this water washing, if the used cleaning water contains scale that has dislodged from the polymerization vessel inner wall surfaces, and particularly from the regions in the vicinity of the gas-liquid interface, the stirring blades, or the top sections or supports of the baffle, this scale is collected in the filter 30. Subsequently, the valves V14, V19, V21, V6, V7 and V10 are closed.

(8) Steam Application and Simultaneous Drying

The supply of hot water to the jacket 2 is halted. The valves V18, V21, V19, V15, V16 and V17 are opened, and 392 kPa·G (4 kgf/cm$^2$·G) (143° C.) of steam, and a coating liquid containing the scale preventive agent are supplied to the polymerization vessel via the line 5 for 1 minute at flow rates of 240 kg/hour and 0.2 L/minute respectively, thus effecting steam application and simultaneous drying. Subsequently, the valves V18, V21, V19, V15, V16 and V17 are closed.

(9) Second Washing of the Polymerization Vessel Interior

The valves V14, V19 and V21 are opened, and the inside of the polymerization vessel 1 is washed with water for 1 minute, and the used cleaning water is discharged into the waste water tank. Subsequently, the valves V14, V19 and V21 are closed.

The operation from the charging step (2) through to the second washing step (9) of the polymerization vessel interior is defined as one batch. In each of the VCM polymerization experiments, the above operation was repeated sufficient times to reach the total number of batches listed in Table 5.

Evaluation Methods

Measurement of the Quantity of Polymer Scale Adhesion

In each experiment, following completion of the final batch (for example, in the case where a total of 200 polymerization batches are conducted, after the 200th batch), the quantity of polymer scale adhesion within the liquid phase section of the polymerization vessel, and the quantities of polymer scale adhesion on the stirring blades, the baffle surfaces, and in the vicinity of the interface between the liquid phase section and the gas phase section were measured using the following method.

The scale adhered to an area of 10 cm×10 cm of the target surface was scraped off with a spatula as completely as could be confirmed with the naked eye, and the removed scale was weighed on a balance. The measured value was multiplied by 100 to determine the quantity of polymer scale adhesion (g) per 1 m$^2$. The results are shown in Table 5.

Measurement of the Quantity of Scale Collected by the Filter

In each experiment, after the completion of the second washing step of the polymerization vessel interior in each batch, and prior to the charging step of the next batch, the dislodged scale from the polymerization vessel inner wall surfaces and the like that had collected within the filter 30 was separated and recovered, and following drying, the weight (g) was measured. For each experiment, the total weight (g) across the total number of batches listed in the Table 5 is shown in Table 5.

Measurement of Fish Eyes

In each experiment, the number of fish eyes when the polymer obtained at the completion of the final batch was formed into a sheet was measured using the method described below. The results are shown in Table 6. 100 parts of the polymer, 50 parts of dioctyl phthalate, 1 part of dibutyltin dilaurate, 1 part of cetyl alcohol, 0.25 parts of titanium oxide and 0.05 parts of carbon black were kneaded at 150° C. for 7 minutes using 6 inch rolls, and the mixture was then formed into a sheet of thickness 0.2 mm. The thus obtained sheet was examined using a light transmission method, and the number of fish eyes per 100 cm$^2$ was counted.

Measurement of Luminosity Index (L Value)

In order to evaluate the anti-initial discoloration property of the polymer when formed into a sheet, the luminosity index (L value) was measured in the manner described below. The results are shown in Table 6.

A mixture containing 100 parts of a product polymer, 1 part of a dibutyltin laurate-based stabilizer (brand name: TS-101, manufactured by Akishima Chemical Co., Ltd.), 0.5 parts of a cadmium organic complex-based stabilizer (brand name: C-100J, manufactured by Katsuta Kako Co., Ltd.), and 50 parts of dioctyl phthalate as a plasticizer was kneaded at 150° C. for 5 minutes using a twin roll mill, and was then formed into a sheet of thickness 0.8 mm. The thus obtained sheet was cut to dimensions of 4 cm×4 cm, and the cut sheet was placed in a molding frame with dimensions of 4 cm×4 cm×1.5 cm, preheated at 160° C. for 5 minutes, and then pressure molded for 5 minutes under a pressure of 2.84 to 3.04 MPa. (29 to 31 kgf/cm$^2$) to prepare a measurement test specimen. The luminosity index L of this test specimen was measured in the manner described below.

First, the stimulus value Y of an XYZ color system was determined by a stimulus direct-reading method in accordance with JIS Z 8722, using the standard light C and a photoelectric calorimeter (brand name: Z-1001 DP, color measuring color difference meter, manufactured by Nippon Denshoku Industries Co., Ltd.). The condition d defined in section 4.3.1 of JIS Z 8722 was employed as the geometric condition of illumination and light reception.

Subsequently, the L value was calculated by entering the determined stimulus value Y in the Hunter's color difference equation defined in JIS Z 8730 (1980):

$$L=10Y^{1/2}$$

The results are shown in Table 6. Larger values of L indicate a higher level of whiteness, namely, a more favorable anti-initial discoloration property.

Measurement of Colored Particles

A mixture containing 100 parts of the polymer obtained at the completion of the final batch of each experiment, 2 parts of a stabilizer TVS N-2000E (a brand name, manufactured by Nitto Kasei Co., Ltd.), and 20 parts of dioctyl phthalate as a plasticizer was kneaded thoroughly, subsequently placed in a molding frame with dimensions of 160 mm×130 mm×3 mm, and then pressure molded at a temperature of 175° C. and under a pressure of 3.43 MPa. (35 kgf/cm$^2$) to prepare a measurement test specimen. The number of colored particles within each test specimen was measured by visual inspection. The results are shown in Table 6.

TABLE 5

| Experiment No. | Coating liquid No. | Total number of batches | Quantity of scale adhesion (g/m²) | | | | Quantity of scale collected by filter (g) |
| --- | --- | --- | --- | --- | --- | --- | --- |
| | | | liquid phase section | gas-liquid interface vicinity | stirring blades | baffle | |
| 101 | 101 | 200 | 0 | 2 | 4 | 4 | 16 |
| 102* | 102* | 100 | 0 | 92 | 25 | 55 | 260 |
| 103* | 103* | 100 | 0 | 40 | 17 | 36 | 220 |
| 104 | 104 | 200 | 0 | 4 | 4 | 4 | 21 |
| 105 | 105 | 200 | 0 | 3 | 5 | 4 | 24 |
| 106 | 106 | 200 | 0 | 0 | 2 | 2 | 15 |
| 107 | 107 | 200 | 0 | 0 | 1 | 2 | 14 |
| 108 | 108 | 200 | 0 | 0 | 1 | 1 | 17 |
| 109 | 109 | 200 | 0 | 0 | 2 | 2 | 18 |
| 110 | 110 | 200 | 0 | 0 | 3 | 2 | 15 |
| 111 | 111 | 200 | 0 | 0 | 2 | 2 | 15 |
| 112 | 112 | 200 | 0 | 0 | 1 | 1 | 16 |
| 113 | 113 | 200 | 0 | 0 | 1 | 1 | 5 |
| 114 | 114 | 200 | 0 | 0 | 0 | 0 | 6 |
| 115 | 115 | 200 | 0 | 0 | 0 | 0 | 1 |
| 116 | 116 | 200 | 0 | 0 | 0 | 0 | 1 |
| 117 | 117 | 200 | 0 | 0 | 0 | 0 | 1 |
| 118 | 118 | 200 | 0 | 0 | 0 | 0 | 1 |
| 119 | 119 | 200 | 0 | 0 | 0 | 0 | 2 |

*Comparative example

TABLE 6

| Experiment No. | Fish eyes (number) | Luminosity index (L value) | Colored particles (number) |
| --- | --- | --- | --- |
| 101 | 10 | 73.0 | 8 |
| 102* | 74 | 72.0 | 72 |
| 103* | 59 | 72.0 | 64 |
| 104 | 10 | 73.0 | 9 |
| 105 | 11 | 73.0 | 8 |
| 106 | 5 | 73.0 | 4 |
| 107 | 6 | 73.0 | 4 |
| 108 | 5 | 73.0 | 5 |
| 109 | 5 | 73.0 | 4 |
| 110 | 4 | 73.0 | 5 |
| 111 | 5 | 73.0 | 3 |
| 112 | 4 | 73.0 | 3 |
| 113 | 3 | 73.0 | 4 |
| 114 | 1 | 73.0 | 1 |
| 115 | 1 | 73.0 | 1 |
| 116 | 1 | 73.0 | 1 |
| 117 | 1 | 73.0 | 1 |
| 118 | 1 | 73.0 | 1 |
| 119 | 2 | 73.0 | 1 |

*Comparative example

[Evaluations]

From the results shown in Table 5 it is evident that in the experiment No. 101, and the experiments No. 104 through No. 119, in which a scale preventive agent comprising an aforementioned component (A) and component (B) of the present invention was used to form a scale preventive coating on the polymerization vessel inner wall surfaces and the like with a single-stage application, even when as many as 200 polymerization batches were repeated under high temperature polymerization reaction conditions at a temperature of 66° C., the quantity of scale adhesion in the vicinity of the gas-liquid interface inside the polymerization vessel, on the stirring blades, and on the baffle, was extremely small.

The quantity of scale collected by the filter 30 corresponds with the quantity of adhered and accumulated scale dislodged from the polymerization vessel inner wall surfaces and the like. Looking at the results for the quantity of scale collected by the filter 30, it is clear that the effect of the scale preventive agents of the present invention in preventing scale adhesion to the polymerization vessel inner wall surfaces and the like is significantly superior. In addition, from the results shown in Table 6 it is evident that in those cases where a scale preventive agent of the present invention is used, the quantity of fish eyes, and the quantity of colored particles, thought to be caused by dislodgement of the scale preventive coating, are minimal, and a polymer product can be obtained that displays absolutely no quality problems in terms of factors such as the anti-initial discoloration.

In contrast, the comparative examples, which used a coating liquid No. 102* or a coating liquid No. 103 *, comprising a condensation product of an aldehyde compound and a hydroxynaphthalene-based compound obtained without the use of a reducing agent, displayed an inferior scale prevention effect, and also produced a polymer product of markedly inferior quality.

What is claimed is:

1. A polymer scale preventive agent for use in the polymerization of at least one monomer containing an ethylenic double bond, comprising: (A) a condensation reaction product obtained by reacting an aldehyde compound and a hydroxynaphthalene-based compound in presence of a reducing agent, and (B) a polymer compound containing a nitrogen atom.

2. The polymer scale preventive agent according to claim 1, wherein said condensation reaction product of said component (A) is a product obtained by conducting a condensation reaction in presence of an organic solvent containing a compound represented by a general formula (1) shown below:

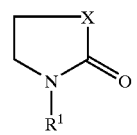

(1)

(wherein, $R^1$ represents an alkyl group of 1 to 3 carbon atoms, and X represents a methylene group ($-CH_2-$) or a bivalent group represented by a formula: $-NR^2-$ (wherein, $R^2$ represents an alkyl group of 1 to 3 carbon atoms)).

3. The polymer scale preventive agent according to claim 1, wherein said condensation reaction product of said component (A) is a product obtained by adding said reducing agent to a reaction system prior to commencement of said condensation reaction, during said condensation reaction, or at both stages.

4. The polymer scale preventive agent according to claim 1, further comprising (C) at least one material selected from a group consisting of inorganic colloids and non-colloidal alkali metal silicates.

5. The polymer scale preventive agent according to claim 1, further comprising a solvent, wherein said agent is in a liquid state, and the content of solid including said component (A) and said component (B) accounts for 4 to 25% by weight of said polymer scale preventive agent.

6. The polymer scale preventive agent according to claim 4, further comprising a solvent, wherein said agent is in a liquid state, and the content of solid including said component (A), said component (B) and said component (C) accounts for 4 to 25% by weight of said polymer scale preventive agent.

7. The polymer scale preventive agent according to claim 1, wherein said aldehyde compound is formaldehyde, acetaldehyde, propionaldehyde, butylaldehyde, acrolein, crotonaldehyde, benzaldehyde, furfural, phenylacetaldehyde, 3-phenylpropionaldehyde, 2-phenylpropionaldehyde or a combination of two or more thereof.

8. The polymer scale preventive agent according to claim 1, wherein said hydroxynaphthalene-based compound comprises 1-naphthol, 2-naphthol, 1,3-dihydroxynaphthalene, 1,5-dihydroxynaphthalene, 1,7-dihydroxynaphthalene, 6-hydroxy-2-naphthoic acid, 2-hydroxy-1-naphthoic acid, 1-hydroxy-2-naphthoic acid, 8-hydroxy-1-naphthoic acid, or a combination of two or more thereof.

9. The polymer scale preventive agent according to claim 1, wherein said reducing agent comprises a sulfite, phosphite, nitrite, reducing sugar, or thiourea dioxide.

10. The polymer scale preventive agent according to claim 1, wherein said polymer compound containing a nitrogen atom comprises a polyethyleneimine, polyacrylamide, N-vinyl-2-pyrrolidone/acrylamide copolymer, cyclic polymer of dimethyldiamylammonium chloride, cyclic polymer of dimethyldiethyldiamylammonium chloride, cyclic polymer of diallylamine hydrochloride, cyclic copolymer of dimethyldiallylammonium chloride and sulfur dioxide, polyvinylpyridine, polyvinylpyrrolidone, polyvinylcarbazole, polyvinylimidazoline, polydimethylaminoethyl acrylate, polydiethylaminoethyl acrylate, a partially cross-linked product, a copolymer, or a graft copolymer of these polymers, a polymeric product produced by introducing a functional group of —OH, —NH$_2$, —COOH, or —SO$_3$H into one of the above polymers, or a combination of two or more of these compounds.

11. The polymer scale preventive agent according to claim 2, wherein the compound represented by the general formula (1) is N-methyl-2-pyrrolidone, N,N'-dimethyl-2-imidazolidone, N-ethyl-2-pyrrolidone, N,N'-diethyl-2-imidazolidone, N-propyl-2-pyrrolidone, N,N'-dipropyl-2-imidazolidone, or a combination of two or more thereof.

12. A process for producing a polymer of a monomer containing an ethylenic double bond, which comprises polymerizing the monomer in a polymerization vessel having a polymer scale preventive coating on its inner wall surfaces and other parts with which said monomer comes into contact during the polymerization, said polymer scale preventive coating comprising the polymer scale preventive agent according to claim 1.

13. The process according to claim 12, wherein said polymer scale preventive coating has been formed by application of a coating liquid containing the polymer scale preventive agent to the inner wall surfaces and said other parts using steam as a carrier.

14. The process according to claim 12, wherein said monomer is a vinyl halide, vinylidene halide, vinyl ester, acrylic acid, ester or salt thereof, methacrylic acid, ester or salt thereof, maleic acid, ester or anhydride thereof, fumaric acid, ester or anhydride thereof, conjugated diene-based monomer, styrene, acrylonitrile, vinyl ether or a combination of two or more thereof.

15. The process according to claim 12, wherein said monomer is polymerized under suspension polymerization or emulsion polymerization.

* * * * *